United States Patent
Gaddie et al.

(10) Patent No.: US 6,843,027 B2
(45) Date of Patent: Jan. 18, 2005

(54) CABLE SYSTEM AND METHOD FOR WIND-RESISTANT BUILDINGS

(76) Inventors: William R. Gaddie, 4618 Baywood Dr., Lynn Haven, FL (US) 32444; Benny K. Moore, 13911 Back Beach Rd., Panama City Beach, FL (US) 32413

(*) Notice: Subject to any disclaimer, the term of this patent is extended or adjusted under 35 U.S.C. 154(b) by 81 days.

(21) Appl. No.: 10/341,453

(22) Filed: Jan. 14, 2003

(65) Prior Publication Data

US 2004/0134140 A1 Jul. 15, 2004

(51) Int. Cl.[7] .............................. E04B 7/04; E04C 5/08; E02D 27/00; E02D 27/32
(52) U.S. Cl. .................... 52/92.1; 52/92.3; 52/92.2; 52/93.1; 52/223.1; 52/223.11; 52/223.13; 52/223.14; 52/223.6; 52/293.3; 52/295
(58) Field of Search ................... 52/92.1, 92.3, 52/92.2, 93.1, 223.11, 223.13, 223.14, 293.3, 295, 223.1, 223.6

(56) References Cited

U.S. PATENT DOCUMENTS

| | | |
|---|---|---|
| 2,327,021 A | 8/1943 | Cushman |
| 3,601,944 A | 8/1971 | Shepherd |
| 4,078,353 A | 3/1978 | Thesingh |
| 4,442,989 A | 4/1984 | Hartmann |
| 4,472,916 A | 9/1984 | Krebs |
| 5,355,640 A * | 10/1994 | Frye ........................ 52/92.1 X |
| 5,448,861 A | 9/1995 | Lawson |
| 5,491,935 A * | 2/1996 | Coxum ........................ 52/92.2 |
| 5,535,561 A * | 7/1996 | Schuyler ................... 52/223.13 |
| 5,671,572 A * | 9/1997 | Siller-Franco ........ 52/223.11 X |
| 5,687,512 A | 11/1997 | Spoozak et al. |
| 5,806,259 A | 9/1998 | Smith |
| 5,862,639 A | 1/1999 | Abou-Rached |
| 5,906,075 A | 5/1999 | Sowers |
| 5,983,572 A | 11/1999 | Laboy |
| 6,088,975 A | 7/2000 | Wiegel |
| 6,105,332 A * | 8/2000 | Boyadjian .............. 52/293.3 X |
| 6,161,339 A | 12/2000 | Cornett, Sr. et al. |
| 6,219,973 B1 * | 4/2001 | Lafferty ....................... 52/92.1 |
| 6,370,835 B1 * | 4/2002 | Morgan et al. .............. 52/92.1 |
| 6,389,761 B1 | 5/2002 | McKinnon |
| 6,430,881 B1 * | 8/2002 | Daudet et al. ............... 52/92.2 |
| 6,460,308 B1 * | 10/2002 | Armstrong et al. .... 52/293.3 X |
| 2001/0037611 A1 * | 11/2001 | Cornett ................. 52/223.13 X |
| 2003/0213192 A1 * | 11/2003 | Pittman ..................... 52/223.1 |
| 2004/0065032 A1 * | 4/2004 | Commins .................. 52/293.3 |

* cited by examiner

Primary Examiner—Rodney B. White
(74) Attorney, Agent, or Firm—Burns, Doane, Swecker & Mathis, L.L.P.

(57) ABSTRACT

A system and method for securing the wall framing and roof of a building structure against wind. A cable tensioner, located between two uprights of the wall framing and below the top plate, is attached to an anchor secured in the foundation. A cable extends over the first roofing member, under the top plate, over a second roofing member, through the cable tensioner, and over a third roofing member. In another embodiment, a cable tensioner has a vertical sleeve, a hollow tube affixed to the vertical sleeve, a rod extending through the vertical sleeve, and a nut threaded onto the nut for tensioning the cable.

20 Claims, 3 Drawing Sheets

CABLE SYSTEM AND METHOD FOR WIND-RESISTANT BUILDINGS

FIELD OF THE INVENTION

This invention relates to a system for protecting a building structure against damage caused by winds, and more particularly to a cable system and method for securing roof members and wall framing.

BACKGROUND OF THE INVENTION

It is well known that high speed wind can do great damage to residential and commercial building structures, particularly in areas prone to hurricanes and other high wind storms. Each year hurricanes cause a considerable amount of damage to buildings, resulting in increased insurance rates. For this reason several states have enacted new building codes designed to insure that new structures are resistant to hurricane speed winds. For example the state of Florida recently enacted a new building code which requires all new buildings to comply with standards by the American Society of Civil Engineers and the Southern Building Code.

Numerous systems have been tried for increasing the wind resistance of buildings. U.S. Pat. No. 5,448,861 to Lawson includes a tethering device intended to secure parts of a building to each other and to a foundation for wind resistance. U.S. Pat. No. 5,687,512 to Spoozak et al. describes a hurricane lockdown system with a loop of a rafter cable secured around eaves of a roof and a number of anchor cables secured to the rafter cable and to the ground. U.S. Pat. No. 5,983,572 to Laboy discloses a system in which tie-down members are strapped across the roof of a building structure. U.S. Pat. No. 6,088,975 to Wiegel discloses a system for wind protection having ground anchors, tiedown cables and a storm shield secured to the cables. In U.S. Pat. No. 6,161,339 to Cornett, Sr. et al., a wire rope stretched over roofing members is attached to a number of tie-down devices above the top plate of a wall frame. Each tie-down apparatus extends from an anchor in the foundation to a point above the top plate. Some of these approaches are unlikely to meet the new wind resistance requirements, or are unwieldy and expensive.

The following references are also of interest. U.S. Pat. No. 6,389,761 B1 to McKinnon relates to an earthquake resistant support structure with a pair of cables extending diagonally between opposite corner members. U.S. Pat. No. 5,806,259 to Smith discloses a reinforcing apparatus including a cable which is secured under tension to anchor brackets mounted on opposite ends of a beam. U.S. Pat. No. 5,862,639 to Abou-Rached relates to a resistant pre-fabricated building panel for making a three-dimensional structure such as a house. In U.S. Pat. No. 3,601,944 to Shepherd, a building frame includes two laterally spaced supporting structures and laterally extending cable trusses anchored to the ground. U.S. Pat. No. 4,087,353 to Thesing describes a method for construction of buildings comprising connecting a cable templet means between the bottom and the top plate members and tensioning the cables to form rigid top and bottom plate boundaries. U.S. Pat. No. 4,472,916 to Krebs is directed to a house construction having a plurality of vertical profile posts. The horizontal cables penetrate the upper ends of the posts to brace each post. U.S. Pat. No. 4,442,989 to Hartmann teaches a cable bearing system consisting of I-shaped bearers arranged in the direction of a cable line. A modular building system is disclosed in U.S. Pat. No. 5,906,075 to Sowers.

A cable tension regulator is disclosed in U.S. Pat. No. 2,327,021 to Cushman.

SUMMARY

In a framed building having a foundation, wall framing including upright studs and a top plate and a sill plate, and roofing members, a system for securing the wall framing and roofing members against wind includes a cable tensioner secured to the foundation and positioned between two uprights and below the top plate and a cable. The cable extends over a first roofing member, from the first roofing member to an underside of the top plate, from the underside of the top plate to a second roofing member, over the second roofing member, from the second roofing member to the cable tensioner, and from the cable tensioner to a third roofing member.

In another embodiment, a cable tensioner includes a vertical sleeve, a rod threaded on both ends and extending through the vertical sleeve, a coupling nut for attaching a threaded end of the rod to an anchor, a hollow tube affixed to the vertical sleeve, and a nut threaded onto another threaded end of the rod. The cable extends through the hollow tube.

In a structure having a foundation, wall framing, and roofing members, a method for securing the wall framing and the roofing members against wind includes attaching a cable tensioner to an anchor secured in the foundation between two uprights of the wall framing, positioning a cable through a cable tensioner, arranging the cable to extending over at least three roofing members. Between a first and a second of the roofing members, the cable extends through a hole in a top plate of the wall framing, under the top plate, and through a second hole in the top plate. Between the second and third of the roofing members, the cable extends through a third hole in the top plate, through the cable tensioner, through a fourth hole in the top plate, and over the third roofing member.

DETAILED DESCRIPTION OF THE PREFERRED EMBODIMENTS

Figure 1:
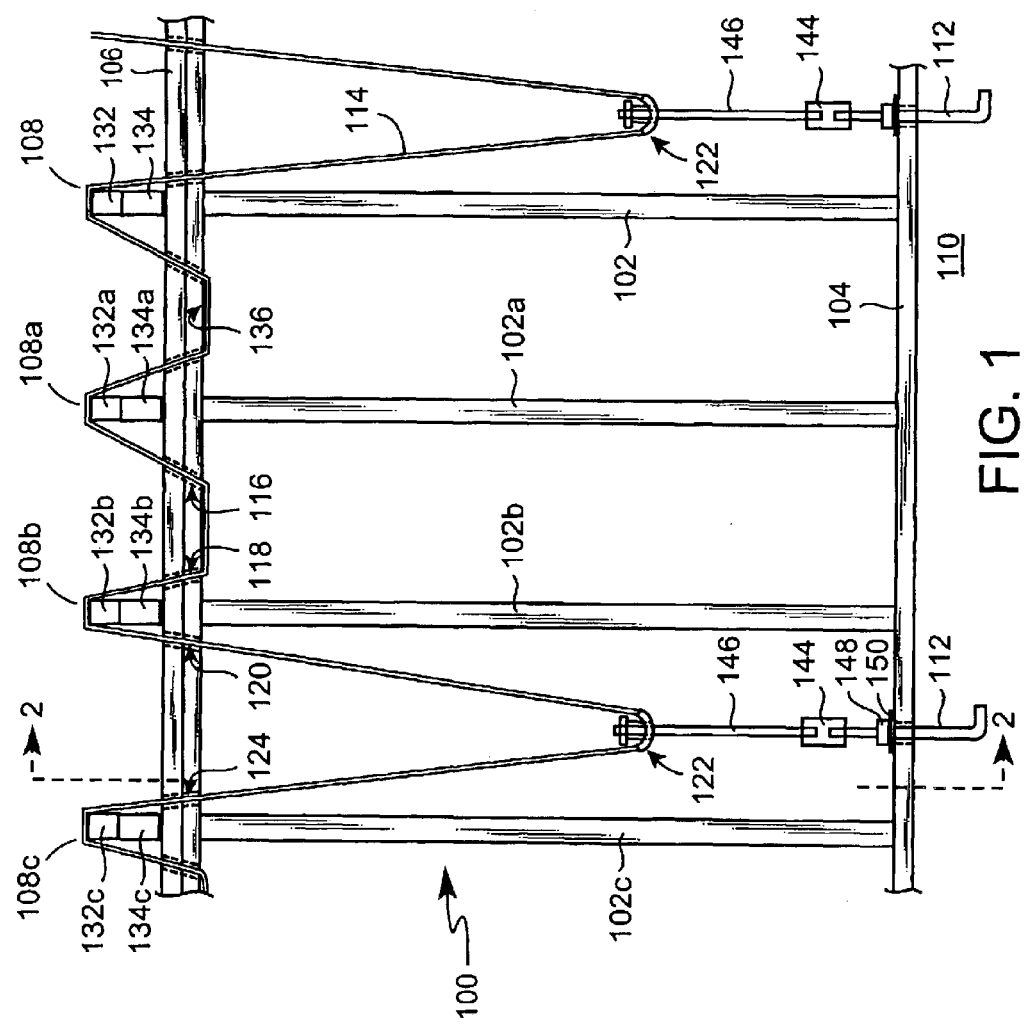
FIG. 1 is an elevational view of a system according to a first embodiment of the invention.

Referring now to the drawings, and more particularly to FIG. 1, one embodiment of a system 100 for securing wall framing and roofing members in a framed building against wind is shown. In a framed building, upright studs 102 extend vertically between a sill plate 104 and a top plate 106. The sill plate 104 rests on a foundation 110 which can be concrete or another suitable material. The foundation 110 can be of various types, including but not limited to a slab, footings, or blocks.

In a first embodiment of the invention, anchors 112 are secured in the building foundation 110. The anchor 112 is connected to a cable tensioner 122 through a rod 146, as described below in greater detail. The anchor 112 can be, for example, an anchor bolt such as a J-shaped bolt having a threaded end which extends out of the foundation 110. The anchor 112 could also be a straight bolt or other type of anchor bolt suitable for resisting upward tensile forces. If a straight bolt is used, a washer can be arranged on the bottom end of the straight bolt to increase the pull resistance of the anchor. Anchor bolts can be made of any type of suitably strong material including, but not limited to, A307 grade steel.

Figure 2:
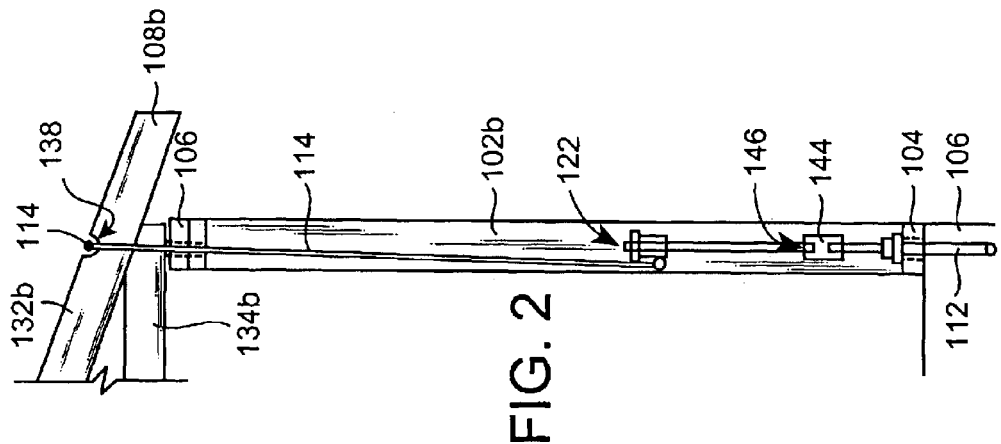
FIG. 2 is an elevational cross-section taken as indicated by lines 2—2 of FIG. 1.

As shown in FIGS. 1 and 2, the anchors 112 are J-shaped bolts which extend through the sill plate 104 of the wall framing. The J-shaped bolts 112 can be extended through the sill plate 104 as shown in FIGS. 1 and 2 to reduce the likelihood that the sill plate 104 will move during high winds. A nut 148 and washer 150 can be threaded onto the anchor 112 above the sill plate 104 to further reduce the likelihood that the sill plate 104 will move during high winds. In addition, this alignment allows the cabling 114 to be located between the inner and outer finished surfaces of the building wall, which can improve the finished appearance of the building structure.

Framed roofs are of various types, and include several types of roofing members 108 which can be secured with the cable 114. As illustrated in FIGS. 1 and 2, the cable 114 secures a number of roofing members 108 of a truss roof to the foundation 110. The roofing members 108 of the truss roof illustrated in FIGS. 1 and 2 include a top truss chord 132 and a bottom truss chord 134 located between the top truss chord 132 and the top plate 106. The cable 114 can extend over the top truss chords 108 or another of the roofing members. Some common roof pitches for truss roofs are 4/12 and 6/12, although greater or lesser roof pitches are also used. In the embodiment of FIGS. 1 and 2, the top truss chords 132 have a 4/12 pitch.

The system and method described herein can also be used for other roof types. As another example, the cable 114 can extend over the horizontal roof joists of a flat roof.

The cable 114 can be any type of flexible tensile member having sufficient strength to withstand the wind load. The cable 114 can be, for example, a wire rope or a strap. In an exemplary embodiment, the cable 114 is a ¼ inch galvanized steel wire rope.

As illustrated in FIG. 1, the cable 114 extends over a number of top truss chords 132 of roofing members 108. In between the roof members 108, the cable 114 extends downward underneath the top plate 106 to either a cable tensioner 122 or along a lower surface 136 of the top plate 106. On one side of an upright stud 102, the cable extends through a cable tensioner 122 located below the top plate 106 and between two upright studs 102. On the other side of the upright stud 102, the cable 114 extends along a lower surface 136 of the top plate 106.

By further reference to FIG. 1, an embodiment of the invention is shown in which the cable 114 extends over the top truss chords 132a, 132b, and 132c of roofing members 108a, 108b, and 108c, respectively. The cable 114 extends over a first top truss chord 132a of roofing member 108a, then extends downward through a hole 116 in the top plate 106. The cable 114 then extends under the top plate 106 for a predetermined distance defined between the uprights 102a and 102b. The cable 114 then extends through another hole 118 in the top plate 106 and over another roof top truss chord 132b. The cable 114 then extends downward through a hole 120 in the top plate 106 and extends further downward between uprights 102b and 102c until it reaches a cable tensioner 122. The cable tensioner 122 is located below the top plate 106. The cable 114 then extends upward through a hole 124 in the top plate 106 and over top truss chord 132c.

Adding tension to the cable with the cable tensioner 122 will pull the cable 114 downward toward the anchors 112 and will secure the roof members 108 as well as the framing members.

Referring again to FIG. 1, as the cable 114 extends from a top surface of the roof member downward to the lower surface of the top plate 106, the cable forms an angle with the horizontal or transverse plane which is at least about 45 degrees, and is preferably between about 45 degrees and about 88 degrees. Similarly, the angle formed by the cable as it extends downward to the cable tensioner 122 from the roof member 108 is between about 45 degrees and about 88 degrees from the horizontal. The location of the cable tensioners 122 below the top plate 106 and the large angles of the cable 114 with the horizontal plane allows the cable 114 to be pulled downward sufficiently to pull the cable 114 tight against the top surface of the roof members 108 and secures the roof trusses 108. The amount of available downward pull is the length of threading on the upper and of the threaded rod 146.

The threaded rod 146 can be threaded throughout its entire length, or can be threaded only on both ends. In one embodiment, the threaded rod 146 is about 36 inches in length. Therefore, for an all-threaded rod 146, the cable tensioner can pull the cable 114 downward at each anchor 112 approximately 30 inches. Threaded rods having a greater or lesser length can also be used.

Passing the cable 114 through holes 116, 118, 120, and 124 in the top plate 106 strengthens the framing structure against horizontal shear forces applied to the framing structure. Other embodiments are also envisioned, in which the cable 114 is routed through a notch in a side of the top plate 106 and/or through a bracket attached to the top plate 106.

The cable 114 can continue around the perimeter of the building structure, or can be tied off at a desired point along the framing structure. As an example, an end of the cable 114 can be attached to a fastener at an anchor 112. If the cable continues around the entire perimeter of the building structure, it can be spliced together where it meets the other end of the cable 114. Additional splices can be added where necessary to extend the length of the cable 114. When the cable 114 extends around the perimeter of the building structure, the roof members and framing members are well secured against wind forces in upward or horizontal directions. For continuing a cable around a corner of the building frame, an anchor 112 and a cable tensioner 122 can be located on either side of the corner upright stud, for example, at a distance of about one foot from the corner upright stud.

As illustrated in FIG. 2, at the point where the cable 114 extends over the upper surface of the top truss chords 132, the cable 114 can be located within a notch 138 in the upper surface of the top truss chord 132b of the roofing member 108b. The notch 138 allows the cable to be tightly held in place without slipping along the upper surface of the top truss chord 132b of the roofing member 108b. Of course, other alternative embodiments are contemplated in which no notch is used. For example, a fastener can be used to prevent the cable 114 from slipping out of position on a top surface of the roofing members 108.

In an exemplary embodiment, the cable 114 is a ¼ inch galvanized steel wire rope, the anchor 112 is a ⅝ inch×10 inch J-bolt embedded in a concrete foundation, and the cable tensioner 122 includes a ⅝ inch diameter rod, with the threaded rod and J-bolt formed of A307 steel.

The anchors 112 and cable tensioners 122 can be spaced at any desired interval along the wall frame. FIGS. 1 and 2 illustrate a spacing between anchors 112 of approximately four feet, with three upright studs 102 at 16 inches on center between the anchors 112. Other alternative spacing arrangements can of course be used, depending on the severity of the wind load expected as well as various design factors including the framing structure, as well as the strength of the cable, the tensioners, and the anchors.

Figure 3:
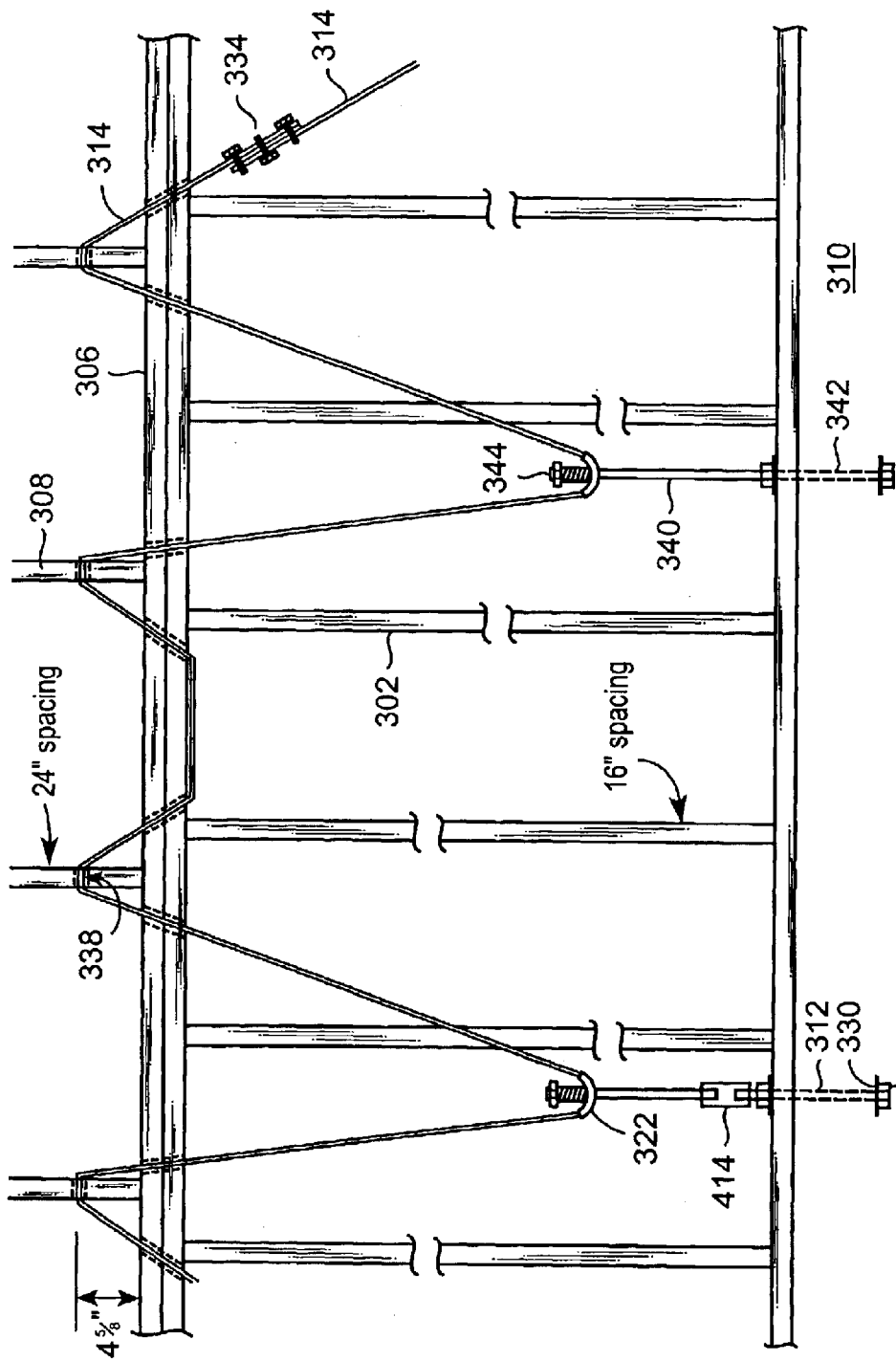
FIG. 3 is an elevation view of a system according to a second embodiment of the invention.

As illustrated by FIGS. 1 and 2, the roof members 108 can be located above each of the uprights 102. In other embodiments, and as illustrated in FIG. 3, the roofing members 308 can be offset from the upright studs 302 due to the different spacing of the upright studs 302 and the roofing members 308. For example, the spacing of the upright studs 302 can be sixteen inches on center and the spacing of the roofing members 308 can be 24 inches on center. FIG. 3 also illustrates a cable splice 334 joining sections of cable 114.

The anchor 312 illustrated in FIG. 3 is example of another suitable anchor. The anchor 312 illustrated in FIG. 3 is a straight, hex head bolt with a washer 330 positioned against the bolt head 332. The washer 330 can be of various sizes or materials. An example of a suitable diameter for the washer is 3 inches, although it can be greater or smaller. Various other types of anchors can also be used.

The embodiment of FIG. 3 also illustrates an integrated cable tensioner 340 that includes both an upper cable tensioner end 344 and a lower anchor end 342 which can be embedded in the foundation 310. The integrated cable tensioner 340 acts to both anchor the cable 114 to the foundation 310 and to set the tension of the cable 314 without a coupling nut.

Figure 6:
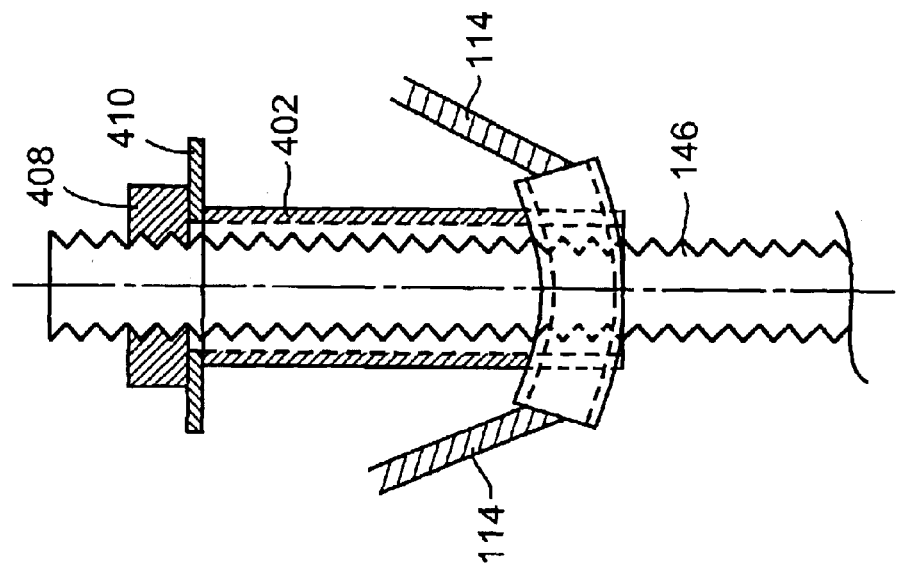
FIG. 6 is a view of a cable tensioner according to an embodiment of the invention with a cable.
Figure 4:
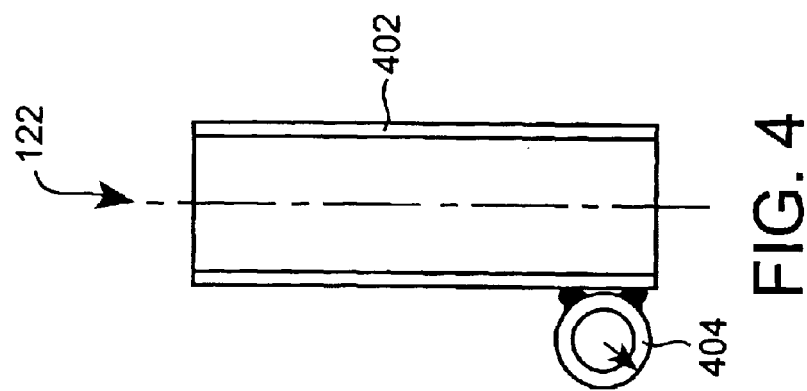
FIG. 4 is a view of a cable tensioner according to an embodiment of the invention.
Figure 5:
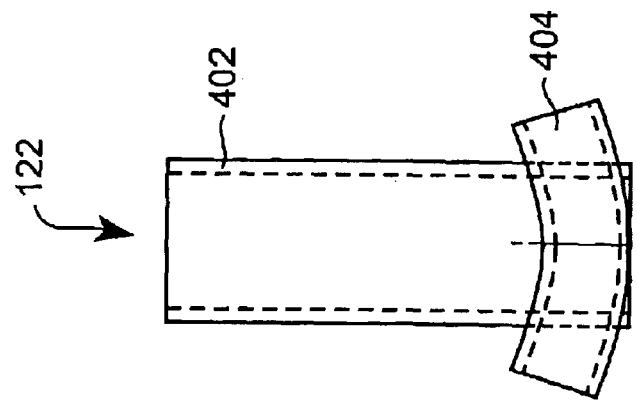
FIG. 5 is another view of a cable tensioner according to an embodiment of the invention.

FIGS. 4, 5, and 6 illustrate an embodiment of a cable tensioner suitable for use in the systems and methods described herein. The cable tensioner 122 can include a vertical sleeve 402, and a hollow tube 404 affixed to the vertical sleeve 402 so that the hollow tube 404 is approximately horizontal when the cable tensioner 122 is in use. The vertical sleeve 402 and hollow tube 404 can be formed of various materials having sufficient strength. As an example, the vertical sleeve 402 can be 12 gauge mechanical tubing with an ⅞ inch outer diameter and a 0.109 inch wall thickness, and the hollow tube 404 can be 16 gauge tubing with a ½ inch outer diameter and a 0.37 inch inner diameter. The vertical sleeve 402 can be any desired length, and in a preferred embodiment is approximately 2½ inches in length. In one embodiment, the hollow tube 404 is welded to the vertical sleeve. Other attachment mechanisms may also be used, or the sleeve 402 and tube 404 can be formed as a single piece.

As illustrated in FIG. 5, the hollow tube 404 can be curved in an upwardly concave direction so that the ends of the hollow tube 404 are angled upward. This configuration can reduce the stress on the cable 114 at the ends of the hollow tube 404.

As illustrated in FIG. 6, in use, a threaded rod 146 extends through and beyond each end of the vertical sleeve 402. The threaded rod 146 can be any material and size suitable to provide sufficient strength, fit between the wall framing members, and allow the cable to be tightened sufficiently. In an exemplary embodiment, the threaded rod 146 is approximately 3 feet in length and ⅝ inches in diameter. In the embodiment shown in FIG. 6, the threaded rod 146 is threaded along its entire length, although it is also envisioned that rods having threads only at at least one of the ends may also be used. At the upper end of the threaded rod 146, a nut 408 and washer 410 can be threaded onto the threaded rod 146 above the sleeve, to hold the threaded rod 402 within the sleeve 402. As illustrated in FIG. 1, at the lower end of the threaded rod 146 a coupling nut 144 attaches the threaded rod 146 to the anchor 112. When configured in this manner, tightening the nut 408 has the effect of pulling the tube 404 and the cable 114 downward. This increases the tension in the cable 114 and tightens the cable 114 against the roof members 108. It will be recognized that other types of cable tensioners can also be used.

Embodiments of the invention also include methods for securing the wall framing and the roofing members against wind. In an exemplary embodiment shown in FIG. 1, the method includes securing a cable tensioner 122 to the foundation between two upright studs 102 of the wall framing, positioning a cable 114 through a cable tensioner 122, and arranging the cable 114 so it extends over at least three roofing members 108. Between a first and a second of the roofing members 108a and 108b, the cable extends downward from a top surface of a top truss chord 132a to an underside of the top plate 106, along the underside of the top plate 106, and upward again to the top surface of the top truss chord 132b. Between the second and third roofing members 108b and 108c, the cable 114 extends downward from a top surface of the top truss chord 108b to the cable tensioner 112, and upward again to the top truss chord 132c. The method can also include tightening the cable tensioner 122 to increase the tension in the cable 114. In an exemplary embodiment, the method includes securing anchors 112 in the foundation so the cable tensioner 122 can be attached to the anchor 112 by a coupling nut 144 or another fastener.

The locations of the anchors 112 can be determined either before the foundation is laid or after the foundation is prepared. If the desired anchor positions are determined before the foundation is prepared, the anchors 112 can be embedded in the foundation at the time the foundation is prepared. It is also possible to secure anchors 112 in the foundation after the foundation has been prepared.

Although the drawing Figures illustrate one-level building structures, in other embodiments of the system and method described herein, buildings with more than one level are secured. In a multi-level building, the cable tensioners 122 can be positioned in the framing area between the floor joist of the top level and the top plate of the top level. Threaded rods can extend from the foundation 110 to the desired location in the framing area below the top plate of the top level.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. In a framed building having a foundation, wall framing including upright studs and a top plate and a sill plate, and roofing members, a system for securing the wall framing and roofing members against wind comprising:

a cable tensioner secured to the foundation and positioned between two uprights and below the top plate; and a cable extending over at least a first, a second, and a third roofing member, wherein the cable extends over a first roofing member, from the first roofing member to a lower surface of the top plate, from the lower surface of the top plate to a second roofing member, over the second roofing member, from the second roofing member to the cable tensioner, and from the cable tensioner to a third roofing member.

2. A system as in claim 1, comprising an anchor in the foundation securing the cable tensioner to the foundation.

3. A system as in claim 1, wherein the cable is inclined at an angle of about 45 degrees to a horizontal plane in an area between the first roofing member and a lower surface of the top plate.

4. A system as in claim 1, wherein the cable is inclined at an angle between about 45 degrees and about 88 degrees to a horizontal plane in an area between the first roofing member and a lower surface of the top plate.

5. A system as in claim 1, wherein between the first and the second roofing members, the cable extends through a hole in the top plate of the wall framing, under the top plate, and through a second hole in the top plate, and between the second and third roofing members, the cable extends through a third hole in the top plate, through the cable tensioner, through a fourth hole in the top plate, and over the third roofing member.

6. A system according to claim 1, wherein the roofing members are defined by top truss chords of a truss roof.

7. A system according to claim 1, wherein at least one of the roofing members is a roof hip rafter.

8. A system according to claim 1, wherein the roofing members are defined by horizontal joists of a flat roof.

9. A system according to claim 1, wherein the cable is positioned in a notch in an upper surface of the roofing member.

10. A system according to claim 1, wherein the anchors are J-shaped anchor bolts having a threaded end extending from the foundation.

11. A system according to claim 1, wherein the anchors are anchor bolts extending through the sill plate of the wall framing.

12. A system according to claim 1, wherein the cable is a ¼ inch galvanized steel cable.

13. A system according to claim 1, wherein the cable tensioner comprises:

a vertical sleeve;

a rod threaded on both ends and extending through the vertical sleeve;

a coupling nut for attaching a first threaded end of the rod to the anchor;

a hollow tube affixed to the vertical sleeve; and a nut threaded onto a second threaded end of the rod, and wherein the cable extends through the hollow tube.

14. A method for securing wall framing the roofing members against wind, comprising:

attaching a cable tensioner to an anchor secured in a foundation between two uprights of the wall framing;

positioning a cable through the cable tensioner, arranging the cable to extend over at least three roofing members, such that between a first and a second of the roofing members, the cable extends through a hole in a top plate of the wall framing, under the top plate, and through a second hole in the top plate, and between the second and third of the roofing members, the cable extends through a third hole in the top plate, through the cable tensioner, through a fourth hole in the top plate, and over the third roofing members.

15. A method according to claim 14, further comprising:

securing the anchors in the foundation.

16. A method according to claim 14, further comprising:

adjusting the cable tensioner to increase tension in the cable.

17. A method according to claim 14, wherein the cable extends over the roofing members at a notch in an upper surface of the roofing members.

18. A cable tensioner for securing cables in a frame wall of a building, the cable tensioner comprising:

a vertical sleeve;

a rod threaded on both ends and extending through the vertical sleeve;

a hollow tube affixed perpendicular to the vertical sleeve;

a coupling nut for attaching one threaded end of the rod to a foundation anchor; and a nut threaded onto another threaded end of the rod, wherein during use, the coupling nut holds the cable tensioner to the foundation member, a cable extends through the hollow tube, and the cable is tensioned by tightening the nut on the threaded end of the rod.

19. A cable tensioner according to claim 18, wherein the hollow tube is welded to the vertical sleeve.

20. A cable tensioner according to claim 18, wherein the vertical sleeve is twelve gauge tubing having an outer diameter of ⅞ inch.

* * * * *